S. STALLINGS.
COTTON CHOPPER.
APPLICATION FILED SEPT. 25, 1908.
970,968.
Patented Sept. 20, 1910.
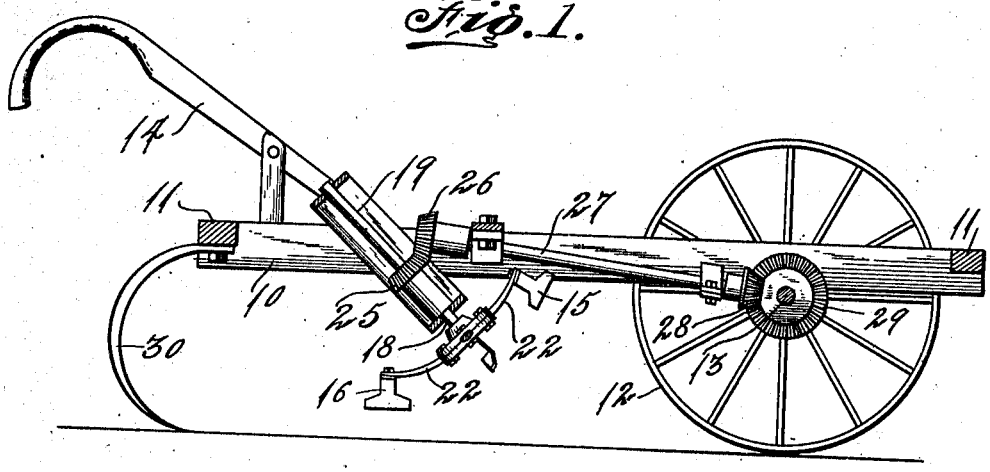
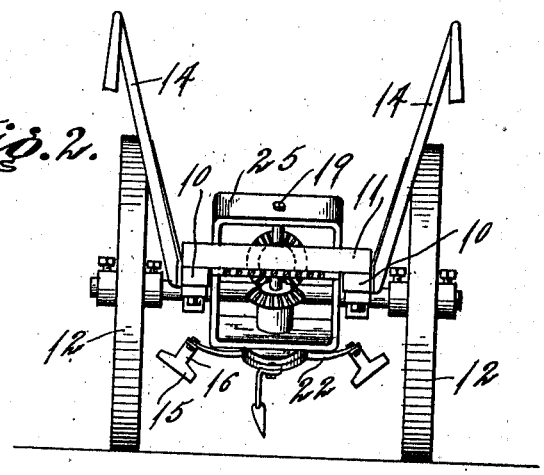
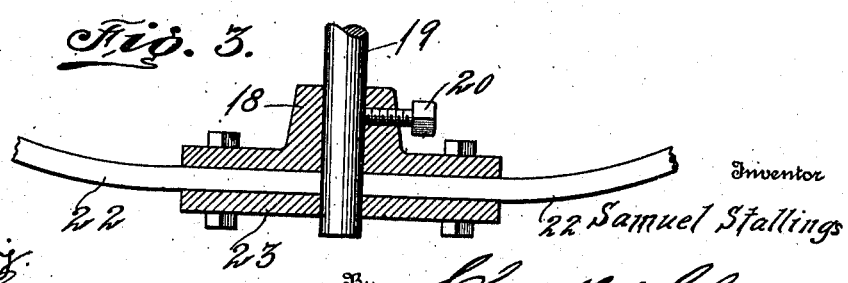

UNITED STATES PATENT OFFICE.

SAMUEL STALLINGS, OF FOUNTAIN INN, SOUTH CAROLINA.

COTTON-CHOPPER.

970,968.       Specification of Letters Patent.    Patented Sept. 20, 1910.

Application filed September 25, 1908. Serial No. 454,774.

To all whom it may concern:

Be it known that I, SAMUEL STALLINGS, a citizen of the United States, residing at Fountain Inn, in the county of Greenville, State of South Carolina, have invented certain new and useful Improvements in Cotton-Choppers; and I do hereby declare the following to be a full, clear, and exact description of the invention, such as will enable others skilled in the art to which it appertains to make and use the same.

This invention relates to that class of cotton choppers characterized by a series of revolving hoes or chopper blades, and it has for its object to provide a machine of this kind which is simple in structure and easy to operate.

A further object of the present invention is to provide a chopper in which the hoes strike a long flat blow whereby the cotton plants and weeds are cut clear across the row.

The invention also has for its object to provide improved means for mounting the hoes as will appear more fully hereinafter.

In the accompanying drawings: Figure 1 is a longitudinal vertical section of the machine. Fig. 2 is a rear view of the machine with the cultivator teeth removed the better to show the working parts. Fig. 3 is a sectional detail of the cutter head.

Referring more particularly to the drawings, the supporting frame of the machine comprises spaced longitudinal side bars 10 which are connected at their ends by cross bars 11. This frame is mounted on wheels 12 carried by an axle 13 which is mounted in suitable bearings near the front end of the frame. The wheels are adjustable on the axle to suit the width of the furrow. To the rear end of the frame are secured handles 14, similar to plow handles, to guide the machine.

The hoes are indicated at 15. They are provided with a shank 16 which may be formed integral therewith, or the shank and the hoe may be separate and fastened together in any suitable manner. If desired, a rake 17 shown in Fig. 7 may be substituted for the hoes. The hoes are carried by a cutter head which is mounted between the bars 10 and is driven from the axle 13. The cutter head comprises a hub 18 having a central opening to receive the cutter head shaft 19, the hub being secured to said shaft by a set screw 20 so that it may be adjusted lengthwise thereon. On the bottom of the hub are grooves 21 to receive the inner ends of the cutter head arms 22 which carry the hoes at their outer ends. The arms are secured to the hub by a plate 23 bolted to the bottom of the hub over the inner ends of said arms. Said plate has an opening to receive the cutter head shaft. The cutter head arms may be made integral, and if so made they have an opening at their junction to receive the cutter head shaft. The cutter head arms may also be formed integral with the hub if desired. The hoe shanks 16 are bolted to the extremity of the arms, the bolt holes 24 of the shanks being oblong to permit adjustment. In the drawings I have shown four cutter head arms and hoes, but their number is immaterial and may be varied if desired.

The cutter head shaft 18 is mounted in bearings carried by a frame 25 which is mounted between the bars 10. On the cutter head shaft is a bevel gear 26 which meshes with a bevel gear on a shaft 27 supported in bearings carried by the bars 10, and said shaft is driven from the axle 13 by means of a bevel gear 28 on the shaft, and a similar gear 29 on the axle. Any other suitable gearing may be provided for driving the cutter head shaft from the axle.

As will be seen in Fig. 1 of the drawings, the cutter head sets obliquely in the supporting frame of the machine, by reason of which the holes are given a downward and upward sweep when the cutter head rotates, and the cutter head arms are so bent that the cutting edges of the hoes are horizontal when the hoes are in their lowermost position. The shanks of the hoes are also curved so that the hoes enter the ground obliquely. By this construction the hoes strike a long flat blow and chop the plants and weeds clear across the row.

At the rear end of the frame, behind the chopper are mounted spring cultivator teeth 30.

The machine herein described is simple in construction and therefore can be cheaply manufactured, it runs easy, and it effectually serves the purpose for which it is devised.

What is claimed is:

In a cotton chopper, a pair of spaced ground wheels, an axle on which said ground wheels are fixed, a frame supporting said axle and including a pair of spaced longitudinally disposed horizontal members, said ground wheels supporting said frame adjacent the front end of the frame, earth working tools supporting the rear end of said frame, a rectangular frame rigidly secured between the longitudinal frame members, said rectangular frame extending at an angle to the first mentioned frame with its lower end inclined forwardly and downwardly and terminating below the first mentioned frame and its upper end terminating above the first mentioned frame, bearings formed in the end members of said rectangular frame, a shaft carried in said bearings, a bevel gear on said shaft and lying within the frame, a shaft extending longitudinally of the first mentioned frame, bearings secured to the first mentioned frame and supporting the longitudinal shaft, a bevel gear on the rear end of the second shaft meshing with the first mentioned bevel gear, bevel gears on the front end of the longitudinal shaft and on the axle, the last mentioned bevel gears meshing to drive the longitudinal shaft as the axle is rotated, a cutter head on the lower end of the first mentioned shaft and situated outside of the inclined frame, cutter head arms carried by said cutter head and recurved toward the upper end of the shaft whereon said head is located, said arms being recurved to such extent that as the shaft is revolved the extremities of the arms will successively assume parallel positions to the ground, and cutter blades carried at the extremities of said arms.

In testimony whereof, I affix my signature, in presence of two witnesses.

SAMUEL STALLINGS.

Witnesses:
G. H. SCRUGGS,
D. E. WEST.